J. W. BINGLEY.
AIR BRAKE APPARATUS.
APPLICATION FILED MAR. 7, 1914.
1,118,886.
Patented Nov. 24, 1914.
2 SHEETS—SHEET 1.
Fig. 1,
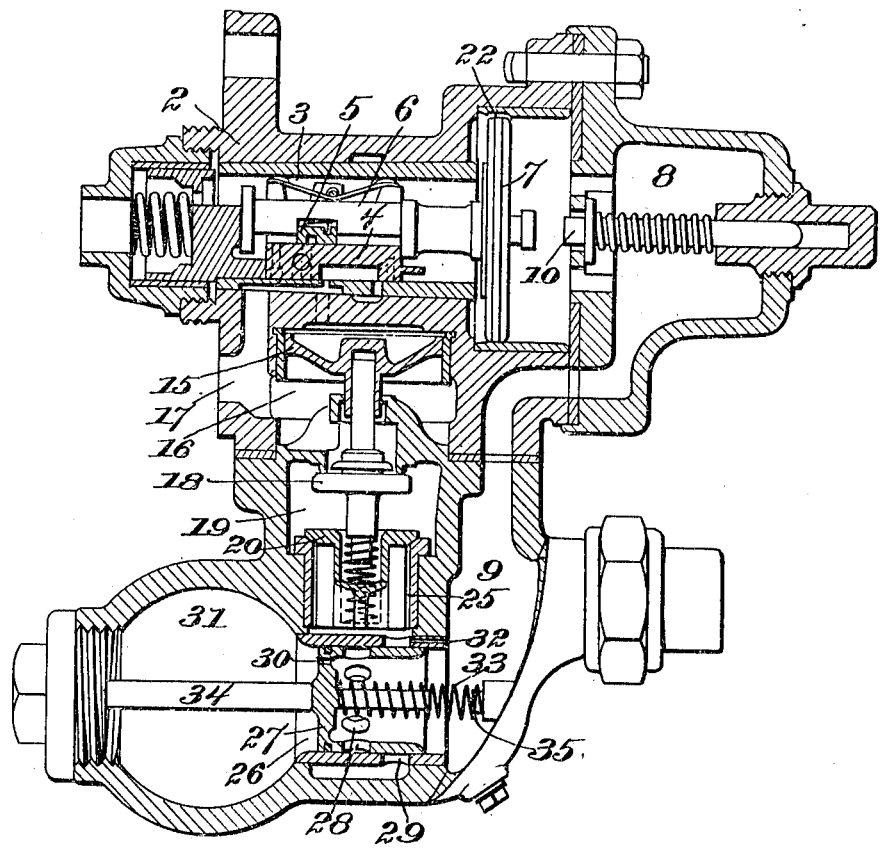

J. W. BINGLEY.
AIR BRAKE APPARATUS.
APPLICATION FILED MAR. 7, 1914.
1,118,886.
Patented Nov. 24, 1914.
2 SHEETS—SHEET 2.
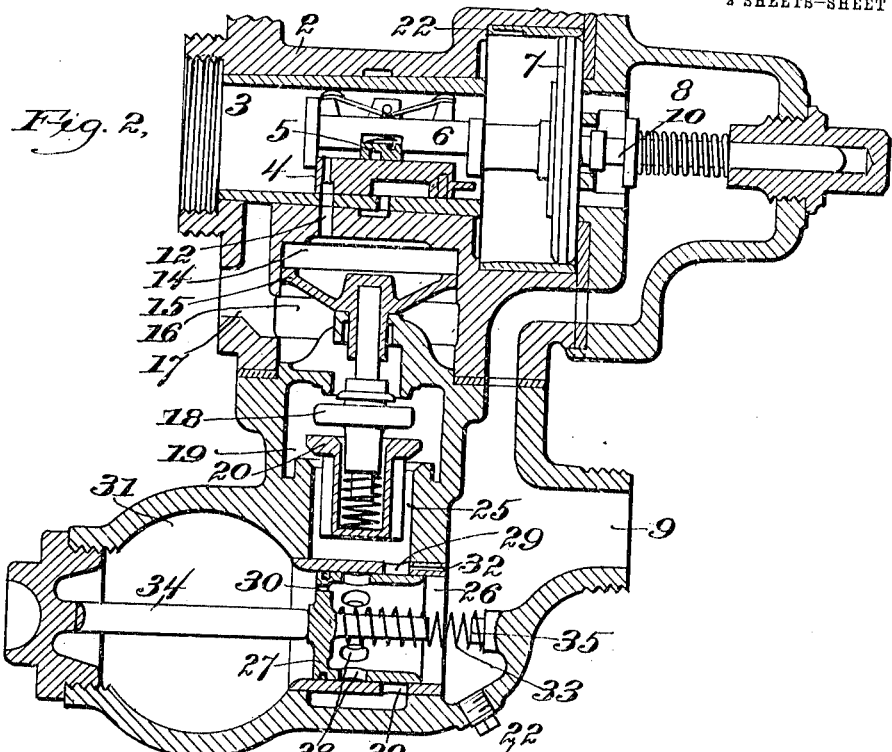
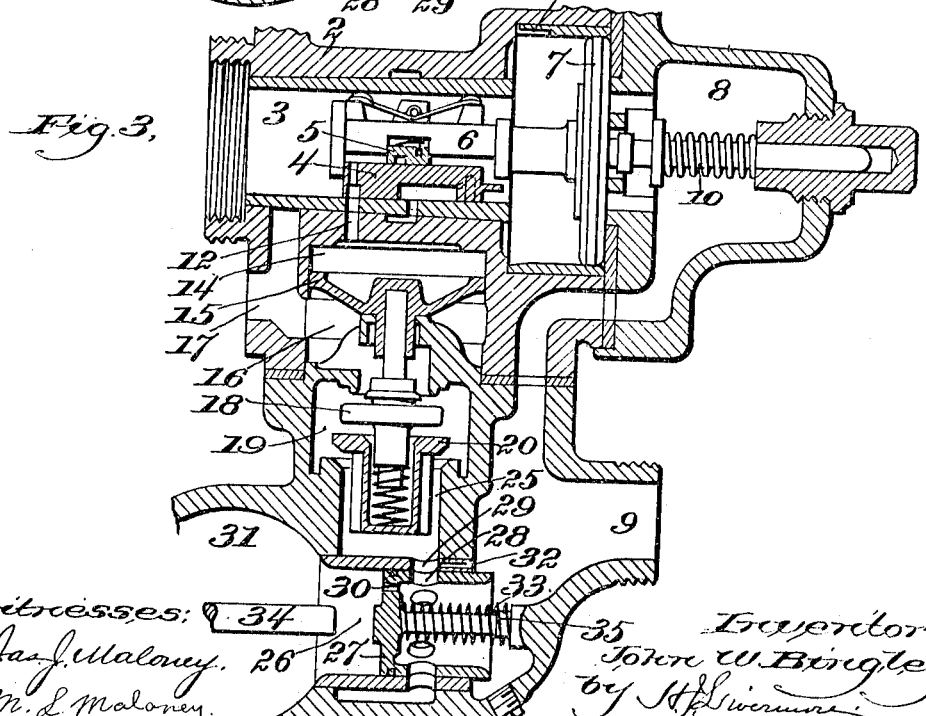

UNITED STATES PATENT OFFICE.

JOHN W. BINGLEY, OF WATERTOWN, NEW YORK, ASSIGNOR TO NEW YORK AIR BRAKE COMPANY, A CORPORATION OF NEW JERSEY.

AIR-BRAKE APPARATUS.

1,118,886.  Specification of Letters Patent.  Patented Nov. 24, 1914.

Application filed March 7, 1914. Serial No. 823,050.

*To all whom it may concern:*

Be it known that I, JOHN W. BINGLEY, a citizen of the United States, residing in Watertown, in the county of Jefferson and State of New York, have invented an Improvement in Air-Brake Apparatus, of which the following description, in connection with the accompanying drawings, is a specification, like letters on the drawings representing like parts.

This invention relates to automatic air brake apparatus, and has for its object to prevent emergency applications of the brakes from being made, owing to the defective condition of a triple valve, when only a service application is desired.

The patent to Turner and Custer, No. 912,512, dated February 16, 1909, shows a construction having a similar object wherein the triple valve piston is prevented from moving to emergency position in service applications by a mechanically acting stop or locking device which positively prevents the triple valve from moving to emergency position in response to slow and moderate train pipe pressure reductions such as are employed for making service applications of the brakes.

The present invention is shown as embodied in a triple valve of substantially the construction shown in the said Turner and Custer patent although it is applicable to other constructions, and the invention consists mainly in the combination with the triple valve parts, of a valve controlling the train pipe vent passage and having its operation controlled by variations in train pipe pressure independently of the movement of the triple valve.

Figure 1 is a vertical longitudinal section of a triple valve provided with appliances for preventing unintentional emergency action in accordance with this invention, the parts being shown in normal release or running position; Fig. 2 is a similar section showing the parts in the position assumed as the result of a defective action which might cause an emergency application of the brakes to be made if not prevented from so doing by the coöperation of the appliances forming the subject of this invention; and Fig. 3 is a similar section showing the parts in the position assumed in making an emergency application in response to the proper conditions for causing an emergency application to be made.

The invention is shown as embodied in a triple valve of the kind which has been extensively used in recent years, having substantially the construction shown in the Turner and Custer patent, before mentioned, except for the appliances shown in said Turner and Custer patent for preventing an emergency application of the brakes in response to a service reduction in train pipe pressure, said triple valve having provision for venting train pipe air into the brake cylinder to effect quick action in service applications as well as in emergency applications. This feature of quick service operation is not essential to the present invention, although, there is greater liability of unintentional emergency applications being made when the valve is provided with such quick service feature than when not so provided, so that the provision for preventing such improper emergency applications is important for such quick service valves.

The main components of the triple valve comprise the triple valve body 2, having the chamber 3 which communicates with the auxiliary reservoir and contains the main slide valve 4 and the auxiliary valve 5 operated by the stem 6 of the triple valve piston 7 in the usual manner all as well understood by those familiar with this art.

The triple valve piston 7 is subjected on one side to train pipe pressure in the chamber 8 which communicates with the train pipe through port 9, and on the other side to the auxiliary reservoir pressure in the valve chamber 3, said piston being moved in one or the other direction to effect the proper operative movement of the valves 4, 5, by a preponderance of one or the other of said pressures as is well understood.

A yielding stop 10 is in position to be encountered by the stem of the triple valve piston 7 when moved by preponderance of auxiliary reservoir pressure over train pipe pressure, the force of said stop being sufficient to arrest the piston when the preponderance of auxiliary reservoir pressure is relatively small but being overcome and permitting further movement of the triple valve piston when the preponderance in auxiliary reservoir pressure is relatively large. As is well known the said stop 10 arrests the piston in making a service application of the brakes in response to a moderate reduction in train pipe pressure which gives the auxiliary reservoir pressure sufficient preponderance to move the piston to the stop 10 and in such movement the valves are shifted so that air flows from the auxiliary reservoir into the brake cylinder and thereby prevents any further substantial increase in preponderance of auxiliary reservoir pressure over train pipe pressure. In making an emergency application of the brakes, however, train pipe pressure is reduced suddenly and extensively leaving the auxiliary reservoir pressure in large preponderance so that it causes the piston 7 to overcome the yielding stop 10 and to travel to the position shown in Figs. 2 and 3. In the position to which the main valve 4 is carried in such emergency operation, a port 12 is uncovered admitting air from the auxiliary reservoir and chamber 3 into the chamber 14 over the emergency piston 15, the chamber 16 at the other side of which communicates with the brake cylinder through the passage 17 through which air is admitted to and exhausted from the brake cylinder in operating the brakes in the usual manner. At the time when such emergency movement of the triple valve piston takes place there is commonly no pressure in the brake cylinder and therefore, the auxiliary reservoir pressure admitted into the chamber 14 forces the piston 15 down and unseats the emergency valve 18 and opens a passage from the chamber 19 to the chamber 16 and thence to the brake cylinder through the passage 17.

In the usual construction of a triple valve, the features of which thus far specifically described, have been in common use for the past twenty-five years, said chamber 19 communicates directly with the train pipe passage 9 through a check valve 20 so that when the emergency valve 18 is opened as has been described the air from the train pipe will lift the check valve 20 and rush into the brake cylinder, and thus locally vent the train pipe, and produce the well known quick serial action which takes place throughout a train having equipments of the general character of that thus far described.

An emergency application, as the name indicates, is ordinarily made only when there is necessity of stopping the train in the shortest possible distance, and the harsh action of such sudden applications of the brakes is highly objectionable and may cause very serious trouble if it takes place when only a moderate application is desired.

An intentional emergency application is produced by sudden large venting of the train pipe produced by the engineer, but the opening of one of the emergency valves 18 on one of the car equipments may produce a sufficiently large and sudden reduction in train pipe pressure to cause other triple valves to be moved to emergency position and thus to produce an emergency application of the brakes even though, except for the opening of such emergency valves 18, the train pipe pressure is falling only enough to cause a service application to be made.

It sometimes happens through some defective condition of a triple valve, due to faulty lubrication or entrance of dirt or some other cause that the triple valve piston may stick and fail to move in response to the preponderance of auxiliary reservoir pressure that would be sufficient to move the valve to service position if it were in proper working condition. Under such conditions in making a service application the train pipe pressure will continue to fall, but at the defective valve the auxiliary reservoir pressure will fall only slightly by back leakage through the feed groove 22 and thus the preponderance in auxiliary reservoir pressure will go on increasing until finally it becomes sufficient to overcome the stickiness when the piston is likely to move with sufficient force to overcome the yielding stop 10 and travel to emergency position, which would cause the local venting of the train pipe, and an emergency application to be made, with the objectionable consequences that have been above suggested. Such action is prevented in accordance with the present invention by the appliances which will now be described and which may be made as an attachment to be applied to existing valves, or, as herein shown is made in place of the usual chamber containing the check valve 20 through which air passes from the train pipe to the brake cylinder in emergency applications as has been described.

Interposed between the passage 25 leading to the seat of the check valve 20 and the train pipe passage 9 is a cylindrical chamber 26 containing a valve, shown as a piston valve 27, having ports 28 which in one position of said valve shown in Fig. 3, communicate with ports 29 and afford a relatively large free communication from the train pipe passage 9 into the passage or chamber 25 leading to the seat of the check valve 20.

A small passage 30 is provided through the piston valve 27 which connects the train pipe passage 9 with a small pressure chamber 31.

As herein shown another small passage 32 is provided which maintains a communication of small capacity between the train pipe passage 9 and the chamber 25.

A spring 33 normally holds the piston valve 27 against a stop 34 when the pressure in the train pipe and chamber 31 are approximately equal, and a stop 35 arrests the movement produced by preponderance of pressure in the chamber 31, at the position shown in Fig. 3, in which the ports 28 and 29 register together.

The operation of the apparatus is as follows: In releasing the brakes after an application the train pipe pressure is increased and moves the triple valve piston and moving parts associated therewith, to the position shown in Fig. 1 where the valve 4 connects the brake cylinder with the atmosphere to release the brakes, and the auxiliary reservoir is recharged through the feed groove 22 in the well known manner. The increase in train pipe pressure will force the piston valve 27 against the stop 34, if not already there, and air will flow from the train pipe through the small passage 30 and charge the chamber 31 to a pressure equal to that in the train pipe.

In making a service application of the brakes, the train pipe pressure is reduced at a comparatively slow rate and if the triple valves are in normal condition they will move to service position and cause the brakes to be applied in the well known manner the triple valve piston being arrested by the yielding stop 10 in this operation as before stated. In such slow reductions of train pipe pressure the air will flow from the pressure chamber 31 through the small passage 30 so as to reduce pressure in the chamber 31 almost as rapidly as in the train pipe so that there will not be sufficient preponderance of pressure in the chamber 31 to move the piston valve 27 from the position shown in Fig. 1, and said piston valve as well as the emergency parts 15, 18 of the triple valve will remain inactive and the triple valve will operate the same as if no quick action venting appliances for emergency operation were present. In case, however, of a defective triple valve which has moved to emergency position shown in Fig. 2 as before explained, the auxiliary reservoir pressure will act on the emergency piston 15 and cause the emergency valve 18 to be opened the same as in a normal emergency operation. This operation of the emergency valve will not, however, effect the local venting of the train pipe because by reason of the slow reduction in train pipe pressure the valve 27 has not been moved from its stop 34 but, as shown in Fig. 2, it remains in the same position as in Fig. 1 in which position it closes the ports 29 and thus shuts off communication from the train pipe to the brake cylinder except through the small passage 32 which is insufficient to reduce the train pipe pressure enough to effect the emergency action of the other triple valves. Thus, notwithstanding the fact that the defective triple valve moves to emergency position the cut off valve 27 prevents local venting of the train pipe and thus prevents the said defective valve from causing an emergency application of the brakes to be made. When, however, an emergency application is desired and the proper sudden and large drop in train pipe pressure is made the small passage 30 through the valve 27 does not permit the pressure in the chamber 31 to fall as rapidly as that in the train pipe, and consequently the preponderance of pressure in the chamber 31 will move said valve 27 to the position shown in Fig. 3 at the same time that the triple valve parts will have been moved to emergency position in response to the train pipe pressure reduction, so that a free passage is afforded from the train pipe passage 9 through the ports 28 in the valve 27 and the ports 29, and past the check valve 20, which is unseated by train pipe pressure, and thence past the emergency valve 18 into the chamber 16 and thence into the brake cylinder through the passage 17 giving the desired emergency action of the equipment under consideration, and causing it to perform its part in effecting the quick serial action of the brakes throughout the length of the train.

In service applications air flows from the train pipe through the passage 32 and other passages provided therefor to effect a moderate local venting of train pipe pressure and thus to produce a quick serial action in making a service application, but this feature need not be described in detail as it is not novel and is not essential to the present invention.

What I claim is:

1. The combination of a triple valve of an automatic air brake apparatus having an emergency valve controlling a vent passage from the train pipe and itself controlled by the triple valve piston and valves actuated thereby; with a controlling valve for the train pipe vent passage governed by variations in train pipe pressure independently of the triple valve piston and parts actuated thereby substantially as and for the purpose described.

2. The combination of a triple valve of an automatic air brake apparatus having an emergency valve controlling a vent passage from the train pipe and itself controlled by the triple valve piston and valves actuated thereby; with a piston valve controlling the train pipe vent passage said piston valve being subject to train pipe pressure on one side and to pressure in a pressure chamber at the other side in communication with the train pipe through a relatively small passage substantially as described.

3. The combination of a triple valve of an automatic air brake apparatus having an emergency valve controlling a vent passage from the train pipe and itself controlled by the triple valve piston and valves actuated thereby; with a piston valve controlling the train pipe vent passage, said piston valve being subject to train pipe pressure on one side and to pressure in a pressure chamber at the other side in communication with the train pipe through a relatively small passage; and stops limiting the movement of said piston valve in response to a preponderance of pressure at one or the other side thereof.

4. The combination of a triple valve of an automatic air brake apparatus having an emergency valve controlling a vent passage from the train pipe and itself controlled by the triple valve piston and valves actuated thereby; with a piston valve controlling the train pipe vent passage said piston valve being subject to train pipe pressure on one side and to pressure in a pressure chamber at the other side in communication with the train pipe through a relatively small passage; a stop limiting the movement of said piston in response to preponderance of train pipe pressure and a spring acting to impel said piston valve toward said stop when the fluid pressures therein are substantially equal.

In testimony whereof, I have signed my name to this specification in the presence of two subscribing witnesses.

JOHN W. BINGLEY.

Witnesses:
 WM. EDWARDS,
 HAZEL HYNES.

Copies of this patent may be obtained for five cents each, by addressing the "Commissioner of Patents, Washington, D. C."